United States Patent [19]
Aratani et al.

[11] Patent Number: 5,230,930
[45] Date of Patent: Jul. 27, 1993

[54] METHOD OF FABRICATING A HIGH-DENSITY MAGNETOOPTIC RECORDING MEDIUM

[75] Inventors: Katsuhisa Aratani, Chiba; Masahiko Kaneko, Kanagawa; Masumi Ohta; Isamu Nakao, both of Tokyo, all of Japan

[73] Assignee: Sony Corporation, Tokyo, Japan

[21] Appl. No.: 832,575

[22] Filed: Feb. 7, 1992

[30] Foreign Application Priority Data

Feb. 8, 1991 [JP] Japan .................................. 3-018068

[51] Int. Cl.$^5$ .................. H01F 10/02; B05D 3/14; B05D 5/12
[52] U.S. Cl. ......................... 427/548; 427/130; 427/131; 427/162; 427/599
[58] Field of Search ............... 427/548, 599, 130, 131, 427/162

*Primary Examiner*—Bernard Pianalto
*Attorney, Agent, or Firm*—Hill, Steadman & Simpson

[57] ABSTRACT

A method of fabricating a magnetooptic recording medium (10) having at least a reproducing layer (11) and a recording layer (13), from which information is read out by changing the state of magnetization of the reproducing layer (11) comprises steps of forming the reproducing layer (11) on a substrate (21), putting a high-density magnetic recording medium (30) storing information in a high-density magnetic pattern into close contact with the reproducing layer (11) to copy the high-density magnetic pattern formed on the high-density magnetic recording medium (30) into the reproducing layer (11), and forming the recording layer (13) over the reproducing layer (11) after copying the high-density magnetic pattern into the reproducing layer, to copy the high-density magnetic pattern into the recording layer (13).

1 Claim, 6 Drawing Sheets

METHOD OF FABRICATING A HIGH-DENSITY MAGNETOOPTIC RECORDING MEDIUM

BACKGROUND OF THE INVENTION

1. Field of the Invention

The present invention relates to a method of fabricating a high-density magnetooptic recording medium.

2. Description of the Prior Art

A magnetooptic recording/reproducing system forms information recording bits, namely, magnetic bubble domains by locally heating a magnetooptic recording medium with a laser beam, and reads out the recorded information by utilizing magnetooptic effect, namely, Kerr effect or Faraday effect. Accordingly, the recording bits must be miniaturized to increase recording density in magnetooptic recording. However, problems arises in reproducing resolution when recording density is increased. Resolution is dependent on the wavelength of the laser beam used for reproducing, and the numerical aperture N.A. of the objective lens.

A general magnetooptic recording/reproducing system will be described with reference to FIGS. 3A to 3D. A method of reproducing binary information recorded in a magnetooptic recording medium 3, such as a magnetooptic disk, will be described. In FIG. 3A, indicated by shaded circles are recording bits 4 formed in a land formed between grooves 1. Suppose that a laser beam is focused in a circular spot 5 on the magnetooptic recording medium. Then, if the recording bits 4 are formed so that only one recording bit 4 is included in the spot 5 as shown in FIG. 3A, the presence or absence of a recording bit 4 in the spot 5 designates either of two state, namely, a digital 1 or a digital 0, as shown in FIG. 3B or 3C. Accordingly, if the recording bits 4 are formed at equal intervals, the magnetooptic recording/reproducing system provides a reproducing output signal having, for example a sinusoidal waveform as shown in FIG. 3D.

If recording bits 4 are formed at a very high bit density as shown in a typical top plan view of a recording pattern in FIG. 4A, it is possible that the spot includes a plurality of recording bits 4. Suppose that two adjacent recording bits among three successive recording bits 4a, 4b and 4c are included in the spot 5. A state in which the two recording bits 4a and 4b are included in the spot 5 as shown in FIG. 4B and a state in which the two recording bits 4b and 4c are included in the spot 5 as shown in FIG. 4C cannot be discriminated from each other, because a reproduced output signal in the state shown in FIG. 4B and a reproduced output signal in the state shown in FIG. 4C are equal to each other. Therefore, the reproduced output signals form, for example, a straight line as shown in FIG. 4D.

Since the conventional magnetooptic recording/reproducing system thus reads the recording bits 4 as recorded on the magnetooptic recording medium 3, restrictions on the reproducing resolution cause problems in S/N (C/N) even if recording bits can be formed in a high bit density, and hence the conventional magnetooptic recording/reproducing system is unable to achieve high-density recording and reproducing.

The reproducing resolution dependent on the wavelength of the laser beam and the numerical aperture of the lens must be improved to solve the problems in S/N (C/N). The applicant of the present patent application proposed a magnetooptic recording/reproducing system capable of reproducing recorded information in a very high resolution in, for example, Japanese Patent Application No. Hei 1-225685 titled "Magnetooptic Recording/Reproducing Method".

This previously proposed magnetooptic recording/reproducing system reads only the recording bit 4 of a temperature in a predetermined temperature range on a magnetooptic recording medium by utilizing a temperature distribution formed on a magnetooptic recording medium formed by the movement of a reproducing spot 5 relative to the magnetooptic recording medium in reproducing recorded information to enhance the resolution. Magnetooptic recording systems may be classified into those of a so-called emergence type and those of an extinction type.

The magnetooptic recording system of an emergence type will be described with reference to FIGS. 5A and 5B. FIG. 5A is a typical top plan view of a recording pattern formed on a magnetooptic recording medium 10, and FIG. 5B is a typical sectional view showing a state of magnetization of the magnetooptic recording medium 10. As shown in FIG. 5A, the magnetooptic recording medium 10 moves in the direction of an arrow d relative to a spot 5 of a laser beam. As shown in FIG. 5B, the magnetooptic recording medium 10 is, for example, a magnetooptic disk having at least a reproducing layer 11 and a recording layer 13 formed of perpendicularly magnetizable films, respectively, desirably, the reproducing layer 11, the recording layer 13 and an intermediate layer 12 formed between the reproducing layer 11 and the recording layer 13. Arrows in the layers 11, 12 and 13 in FIG. 5B indicate the direction of magnetic moment typically. In FIG. 5B, magnetic domains indicated by the downward arrows are in an initial state, for example, a 0 state or a 1 state, and those indicated by the upward arrows are recording bits 4 in a 1 state or 0 state formed at least in the recording layer 13.

In reproducing recorded information signals from the magnetooptic recording medium 10, an external initializing magnetic field $H_i$ is applied to the magnetooptic recording medium 10 to magnetize the reproducing layer 11 downward, as viewed in FIG. 5B, for initialization. Although the recording bits 4 of the reproducing layer 11 are extinguished by initialization, the respective directions of magnetization of regions in the reproducing layer 11 and the recording layer 13 corresponding to the recording bits 4 are maintained reverse to each other by magnetic domain walls formed in the intermediate layer 12, so that the recording bits 4 remain in latent recording bits 41.

A reproducing magnetic field $H_r$ of a direction reverse to that of the initializing magnetic field $H_i$ is applied at least to the reproducing regions of the magnetic recording medium 10. As the magnetic recording medium 10 moves, the region having the initialized latent recording bit 41 comes under the spot 5. Then, a high-temperature region 14 is formed in the front side of the spot 5 as indicated by a shaded area enclosed by a broken line a. In the high-temperature region 14, magnetic domain walls in the intermediate layer 12 disappear, the magnetization of the recording layer 13 is copied into the reproducing layer 11 by exchange force, so that the latent recording bit 41 in the recording layer 13 emerges in the reproducing layer 11 in a reproducible recording bit 4.

Accordingly, the recording bit 4 can be read by detecting the rotation of the plane of polarization of the spot 5 caused by Kerr effect or Faraday effect corresponding to the direction of magnetization of the reproducing layer 11. Latent recording bits 41 in a low-temperature region 15, other than the high-temperature region 14, in the spot 5 do not emerge into the reproducing layer 11, and hence the reproducible recording bit 4 is included only in the narrow high-temperature region 14. therefore, even if information is recorded in a high recording density on the magnetooptic recording medium 10 capable of high-density recording, in which a plurality of recording bits 4 are included in the spot 5, only one of the recording bits 4 can be read for high-resolution signal reproducing.

To carry out signal reproducing in such a mode, the initializing magnetic field $H_i$, the reproducing magnetic field $H_r$, the respective coercive forces, values of thickness, intensities of magnetization and values of domain wall energy of the magnetic layers are determined selectively according to the temperature of the high-temperature region 14 and that of the low-temperature region 15. The coercive force $H_{c1}$, thickness $h_1$ and saturation magnetization $M_{s1}$ of the reproducing layer 11 must meet an expression (1) to initialize only the reproducing layer 11.

$$H_i > H_{c1} + \sigma_{w2}/2M_{s1}h_1 \tag{1}$$

where $\sigma_{w2}$ is the interfacial domain wall energy between the reproducing layer 11 and the recording layer 13.

An expression (2) must be met to maintain the information recorded in the recording layer 13 by the magnetic field.

$$H_i < H_{c3} - \sigma_{w2}/2M_{s3}h_3 \tag{2}$$

where $H_{c3}$ is the coercive force, $M_{s3}$ is the saturation magnetization and $h_3$ is the thickness of the recording layer 13.

An expression (3) must be met to maintain the magnetic domain walls formed in the intermediate layer 12 between the reproducing layer 11 and the recording layer 13 after the initializing magnetic field $H_i$ has been applied to the magnetooptic recording medium 10.

$$H_{c1} > \sigma_{w2}/2M_{s1}h_1 \tag{3}$$

An expression (4) must be met to heat the high-temperature region 14 at a selected temperature $T_H$.

$$H_{c1} - \sigma_{w2}/2M_{s1}h_1 < H_r < H_{c1} + \sigma_{w2}/2M_{s1}h_1 \tag{4}$$

The magnetization of the latent recording bits 41 of the recording layer 13 can be copied into the reproducing layer 11 only in regions corresponding to the magnetic domain walls of the intermediate layer 12 to form recording bits 4 in the reproducing layer by applying the reproducing magnetic field $H_r$ meeting the expression (4).

Although the magnetooptic recording medium 10 employed by this magnetooptic recording/reproducing system has the reproducing layer 11, the intermediate layer 12 and the recording layer 13, the magnetooptic recording/reproducing system may employ a four-layer magnetooptic recording medium additionally provided with an auxiliary reproducing layer 17 between the reproducing layer 11 and the intermediate layer 12 as shown in an enlarged typical sectional view in FIG. 6. The auxiliary reproducing layer 17 supplements the characteristics of the reproducing layer 11 to compensate the coercive force of the reproducing layer 11 at a room temperature to stabilize the magnetization of the reproducing layer 11 caused by the initializing magnetic field $H_i$ regardless of the existence of magnetic domain walls and to decrease the coercive force sharply at a temperature near the reproducing temperature so that the magnetic domain walls of the intermediate layer 12 expand into the auxiliary reproducing layer 17 to finally invert the reproducing layer 11 and to extinguish the magnetic domain walls for satisfactory emergence of the recording bits 4.

The coercive force $H_{cl}$ of the reproducing layer 11 of a four-layer magnetooptic recording medium provided with the auxiliary reproducing layer 17 is substituted b $H_{CA}$ expressed by an expression (5) and the term $\sigma_{w2}/M_{s1}h_1$ is substituted by $\sigma_{w2}/(M_{s1}h_1 + M_{ss}h_s)$ $$H_{CA} = (M_{s1}h_1 H_{c1} + M_{ss}h_s H_{cs})/(M_{s1}h_1 + M_{ss}h_s) \tag{5}$$

where $H_{c1} < H_{CA} < H_{cs}$ for the magnetooptic recording/reproducing system of an emergence type, and $M_{ss}$, $h_s$ and $H_{cs}$ are the saturation magnetization, coercive force and thickness, respectively, of the auxiliary reproducing layer 17.

The magnetooptic recording/reproducing system of an extinction type will be described hereinafter with reference to FIGS. 7A and 7B. FIG. 7A is a typical top plan view of a recording pattern formed on a magnetooptic recording medium 10, and FIG. 7B is a typical sectional view showing a state of magnetization, in which parts like or corresponding to those shown in FIGS. 5A and 5B are denoted by the same reference characters and the description thereof will be omitted.

This magnetooptic recording medium 10 does not need the initializing magnetic filed $H_i$. In reproducing information recorded on the magnetooptic recording medium 10, the high-temperature region 14 is heated so that an expression (6) is satisfied, and then an external reproducing magnetic field $H_r$ is applied to the magnetooptic recording medium 10 to extinguish recording bits 4 in the high-temperature region 14 included in the spot 5 of a laser beam in the reproducing layer 11 magnetized downward as viewed in FIG. B.

$$H_r > H_{c1} + \sigma_{w2}/2M_{s1}h_1 \tag{6}$$

Thus, the magnetooptic recording/reproducing system of an extinction type enables information stored only in the recording bits 4 in the low-temperature region 15 in the spot 5 to be reproduced to improve the resolution. The conditions including the coercive force are determined so that the recording bits 4 of the recording layer 13 remain in latent recording bits 41 in an extinction state and the magnetization of the recording layer 13, i.e., the recording bits 4, are copied into the reproducing layer 11 and held therein in a reproducible state at a room temperature.

These magnetooptic recording/reproducing systems of an emergence type and an extinction type reproduce the recording bit in a local region included in the spot of the reproducing laser beam to reproduce the information in an enhanced resolution.

It is also possible to reproduce recorded information by a magnetooptic recording/reproducing system of a combined type having functions of both the magnetooptic recording/reproducing system of an emergence type and the magnetooptic recording/reproducing system of an extinction type. The magnetooptic recording/reproducing system of a combined type forms a high-temperature region 14, a middle-temperature region 16 and a low-temperature region 15 in the front portion, middle portion and rear portion with respect to the direction of movement of the magnetooptic recording medium relative to a spot 5, respectively, of the spot 5 as shown in FIG. 8, and utilizes the high-temperature region 14 for the functions of the extinction type described with reference to FIGS. 7A and 7B, and the middle-temperature region 16 and the low-temperature region 15 for the functions of the emergence type described with reference to FIGS. 5A and 5B.

This magnetooptic recording/reproducing system of a combined type is able to make only a recording bit 4, a shaded circle in FIG. 8, included in the narrow middle-temperature region 16 between the high-temperature region 14 and the low-temperature region 15 emerge into the reproducing layer 11. Accordingly, the magnetooptic recording/reproducing system of a combined type is capable of reproducing recorded information in a high resolution.

Thus, the magnetooptic recording/reproducing systems are able to reproduce recorded information in a very high resolution regardless of the wavelength λ of the laser beam and the numerical aperture N.A. of the objective lens. Accordingly, the magnetooptic recording system need not use a reading light beam of a particularly short wavelength and is able to determine the wavelength of a reading light beam taking into consideration magnetooptic effect, heating effect, and the sensitivity of the optical detector. That is, the magnetooptic recording/reproducing system is able to reproduce recorded information in a high resolution even if the same uses a semiconductor laser beam having a comparatively large wavelength, such as 780 nm.

The magnetooptic recording/reproducing system capable of reproducing recorded information in a very high resolution enables high-density recording, namely, miniaturization of recording bits and reduction of the pitch of recording bits.

If minute bits are formed by using such a reproducing semiconductor laser beam for recording, namely, if minute bits are formed by the same spot as that for reproducing (reading), the magnetooptic recording medium must be heated by the laser beam in a temperature distribution having a peak corresponding to a temperature $T_w$ capable of forming a recording bit, for example, the Curie temperature, and the recording bit must be formed in a width corresponding to a small region $\phi_p$ as shown in FIG. 9, which requires strict conditions for materials forming the magnetic layers of the magnetooptic recording medium and the power of the recording laser beam. Such strict conditions make the enhancement of recording density difficult as compared with the improvement of the resolution of the magnetooptic recording/reproducing system.

SUMMARY OF THE INVENTION

Accordingly, it is an object of the present invention to provide a method of fabricating a magnetooptic recording medium capable of recording information in a high recording density that enables reproducing the recorded information in a sufficiently high resolution by such magnetooptic recording/reproducing systems.

In one aspect of the present invention, a method of fabricating a high-density magnetooptic recording medium having at least a reproducing layer and a recording layer, from which recorded signals are read by changing the state of magnetization of the reproducing layer, comprises steps of forming the reproducing layer on a substrate, copying a high-density magnetic pattern formed on a high-density magnetic recording medium from the high-density magnetic recording medium into the reproducing layer by putting the high-density magnetic recording medium in close contact with the reproducing layer, and forming the recording layer over the reproducing layer.

Information can be recorded magnetically in the reproducing layer of the magnetooptic recording medium in a very high density, which cannot be achieved by magnetooptic recording, by copying the information recorded in a very high density on the high-density magnetic recording medium, because the information can be recorded on the high-density magnetic recording medium, such as a high-density magnetic recording medium provided with a vertically magnetizable film, by using a unipolar magnetic head or a short wave in a density higher than that can be achieved by magnetooptic recording.

When magnetic layers including the recording layer is formed by an ordinary film forming process, such as a sputtering process, over the reproducing layer after forming the high-density magnetic pattern on the reproducing layer, the high-density magnetic pattern is copied on the magnetic layers.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Prior to the description of the preferred embodiments of the present invention, the effect of the present invention proved through experiments will be described.

Figure 2:
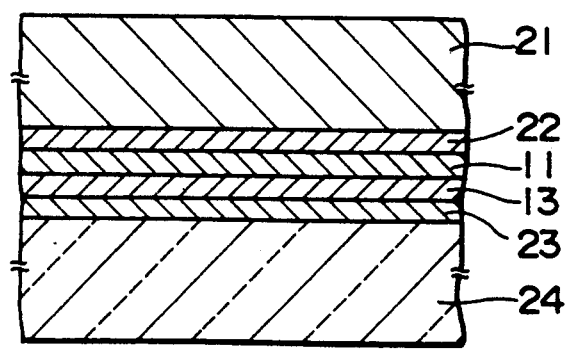
FIG. 2 is an enlarged schematic sectional view of a magnetooptic recording medium.
Figure 3A:
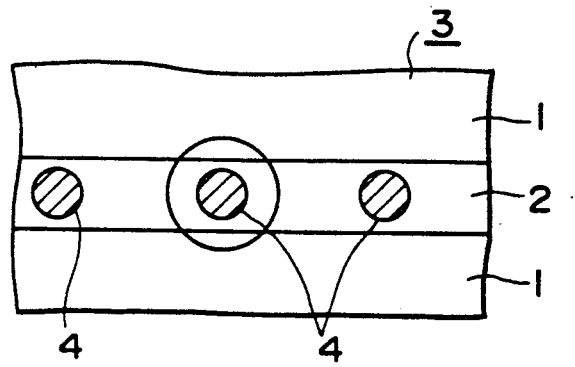
FIGS. 3A, 3B, 3C and 3D are diagrammatic views of assistance in explaining a conventional magnetooptic recording/reproducing system.
Figure 3B:
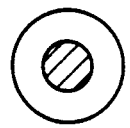
Figure 3C:
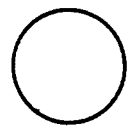
Figure 3D:
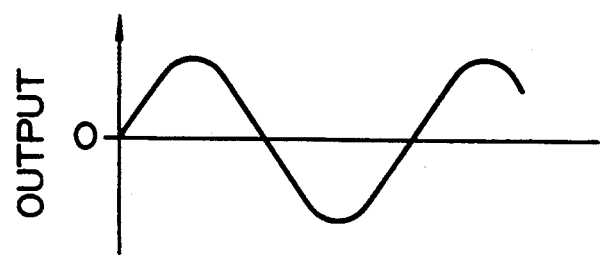
Figure 4A:
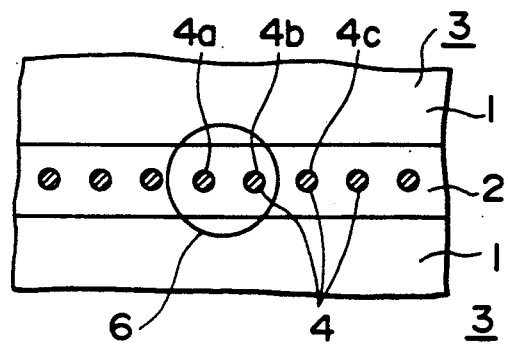
FIGS. 4A, 4B, 4C and 4D are diagrammatic views of assistance in explaining the information reproducing characteristics of a conventional magnetooptic recording/reproducing system.
Figure 4B:
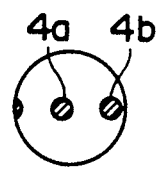
Figure 4C:
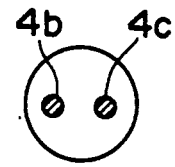
Figure 4D:
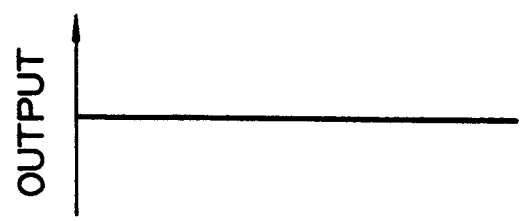
Figure 5A:
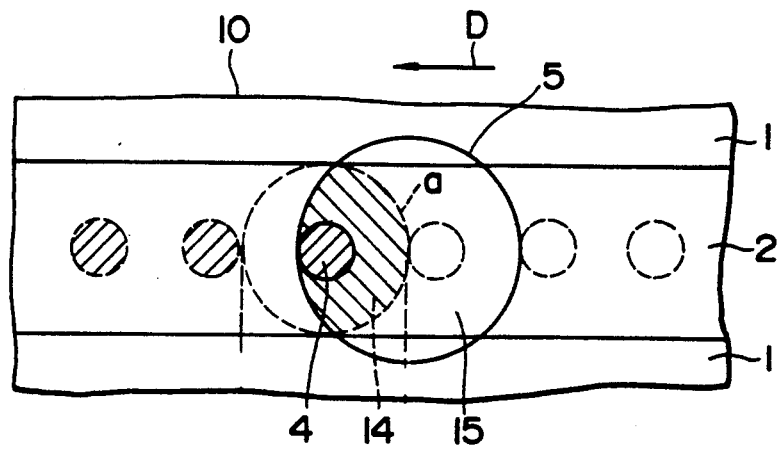
FIGS. 5A and 5B are diagrammatic views of assistance in explaining a magnetooptic recording/reproducing system of an emergence type.
Figure 5B:
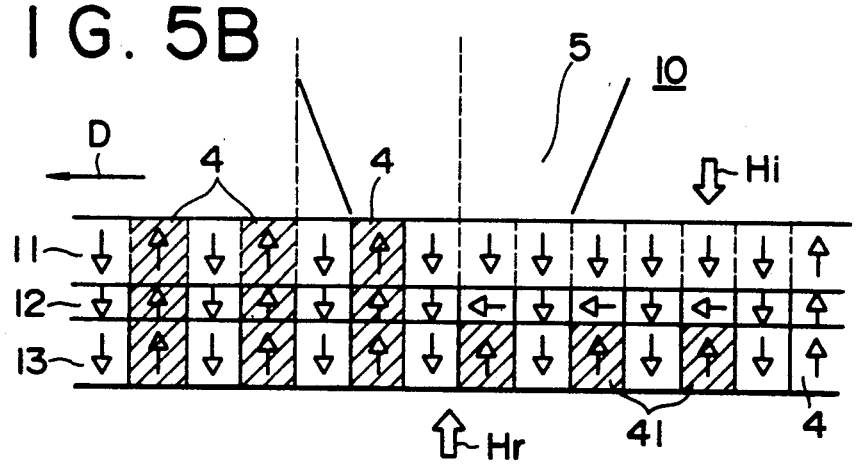
Figure 6:
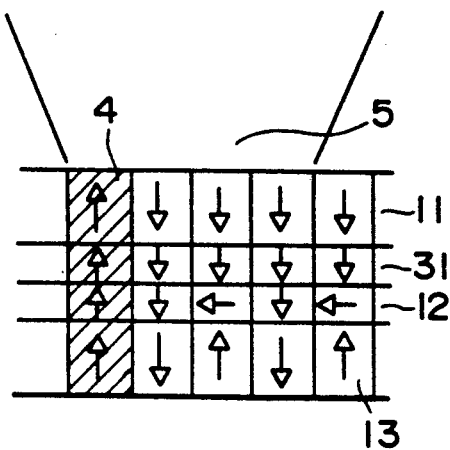
FIG. 6 is a typical sectional view of a magnetooptic recording medium.
Figure 7A:
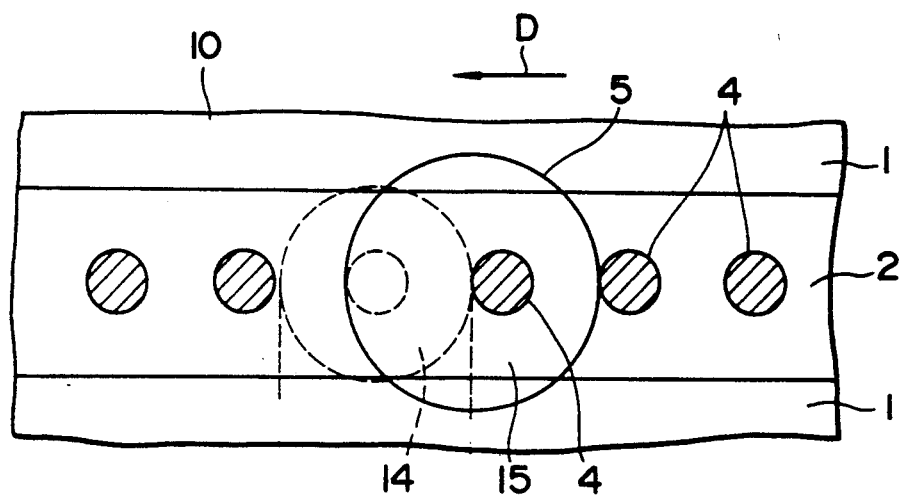
FIGS. 7A and 7B are diagrammatic views of assistance in explaining a magnetooptic recording/reproducing system of an extinction type.
Figure 7B:
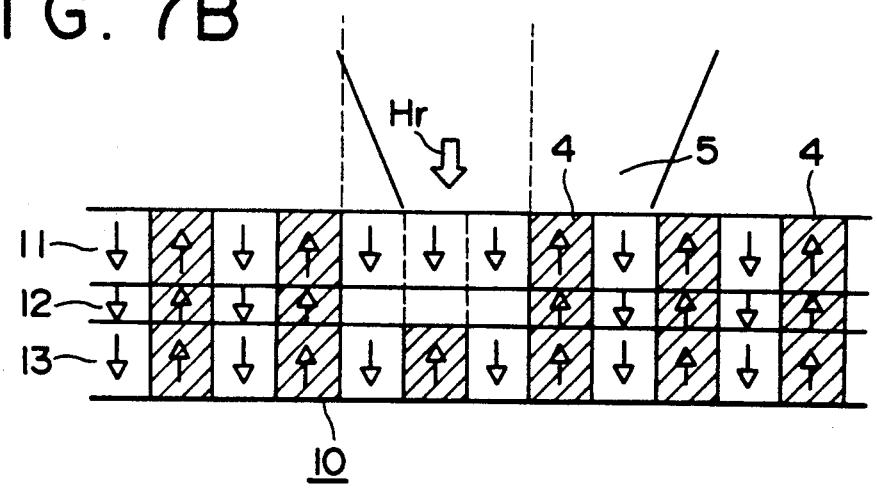
Figure 8:
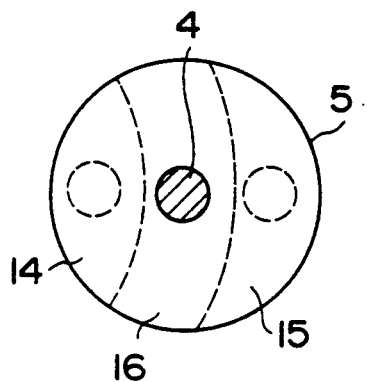
FIG. 8 is a diagrammatic view of assistance in explaining another magnetooptic recording/reproducing system.
Figure 9:
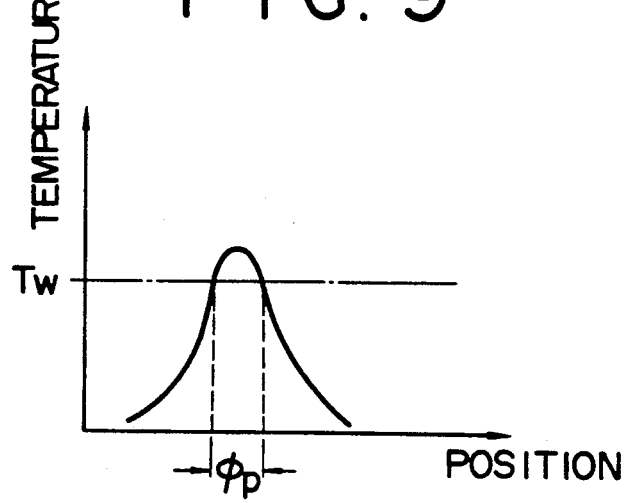
FIG. 9 is a graph showing a temperature distribution on a magnetooptic recording medium.

Referring to FIG. 2, a dielectric layer 22 of $Si_3N_4$ was formed in a thickness of about 750 Å by sputtering on a polycarbonate substrate 21 having the shape of a disk, and then a reproducing layer 11 of TbFeCo was formed in a thickness of about 750 Å by sputtering over the dielectric layer 21. Then, information was recorded on the reproducing layer 11 in the atmosphere by a light intensity modulation system in a region corresponding to the range of radius r of 32 to 50 mm. In recording the information, the substrate 21 was rotated at 2400 rpm, recording frequency was 4 MHz, and recording power was regulated so that the second harmonic is a minimum when r=40 mm. When the information recorded on a circle having a radius of 40 mm was reproduced through the substrate 21 by rotating the substrate at 2400 rpm and by using reproducing power Pr=2 mW, C/N was 45 dB.

An oxide film formed over the surface of the reproducing layer 11 by etching. Etching conditions were: pressure of Ar gas=0.6 Pa, power=0.3 kW and etching time=10 min.

The substrate 21 provided with the dielectric layer 22 and the reproducing layer 11 was left to cool sufficiently for about 30 min. Then, a recording layer 13 of TbFeCo was formed in a thickness of about 750 Å over the reproducing layer 11, a dielectric layer 23 of $Si_3N_4$ as a protective layer was formed in a thickness of about 750 Å over the recording layer 13, and then a glass plate 24 was affixed to the dielectric layer 23. Information recorded in a region corresponding to the radius r=40 mm was reproduced through the substrate 21 by reproducing power Pr=2.0 mW while the magnetooptic recording medium was rotated at 2400 rpm. The carrier level C was −5 dBm, the noise level N was −48 dBm and C/N was 44 dB. The value of C/N in reproducing the information from the recording layer 13 was approximately equal to that in reproducing the same information from the reproducing layer 11; that is, the information recorded on the reproducing layer 11 had been copied satisfactorily into the recording layer 13.

The foregoing experiments proved that the magnetic information recorded on the reproducing layer 11 by putting a high-density magnetic recording medium in close contact with the reproducing layer 11 can be copied into the recording layer 13 formed over the reproducing layer 11 by sputtering after magnetically recording the information on the reproducing layer 11. Thus, the method in accordance with the present invention is capable of simply and surely fabricating a magnetooptic recording medium 10 storing magnetic information in a high density.

Furthermore, recording the magnetic information on the reproducing layer 11 by putting a high-density magnetic recording medium storing the magnetic information in close contact with the reproducing layer 11 is suitable for the mass production of magnetooptic recording media and enables the mass production of magnetooptic recording media at a high productivity.

A method of fabricating a high-density magnetooptic recording medium, in a preferred embodiment according to the present invention as applied to fabricating a magnetooptic disk storing magnetic information in a high density will be described hereinafter with reference to FIGS. 1A to 1C.

Figure 1A:
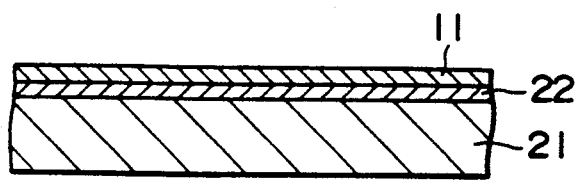
FIGS. 1A, 1B and 1C are schematic sectional views in explaining a method of fabricating a high-density magnetooptic recording medium, embodying the present invention.

Referring to FIG. 1A, a dielectric layer 22 of SiN is formed in a thickness of 800 Å on a transparent substrate 21 of polycarbonate PC or the like, and then a reproducing layer 11 of a material having a relatively small coercive force $H_c$, such as GdFeCo, is formed in a thickness of 800 Å over the dielectric layer 22 by sputtering or the like.

Figure 1B:
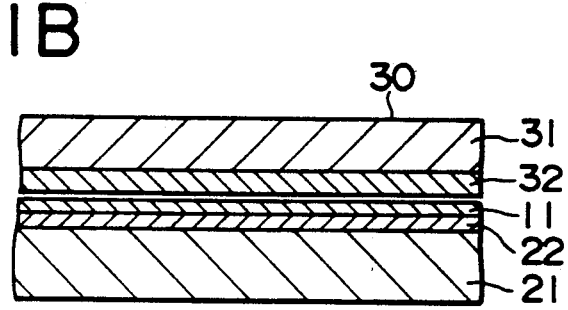

Then, as shown in FIG. 1B, a high-density magnetic recording medium 30 storing information in a high-density magnetic pattern is put in close contact with the reproducing layer 12 to copy the high-density magnetic pattern into the reproducing layer 11. The high-density magnetic recording medium 30 is consists of a substrate 31 formed of a PET (polyethylene terephthalate) sheet, and a magnetic layer 32 formed over the substrate 31. The magnetic layer 32 is a vertically magnetizable film, such as a CoCr film or a barium ferrite film. The The information is recorded on the high-density magnetic recording medium 30 in a high density by using a unipolar magnetic head or a ring head.

Figure 1C:
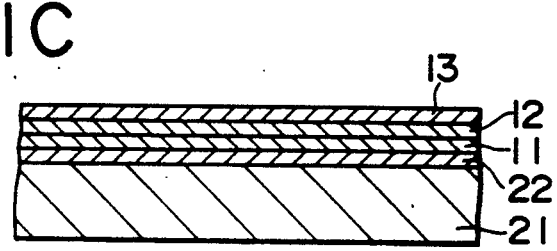

Then, as shown in FIG. 1C, a 800Å thick intermediate layer 12 of TbFeCoAl or the like and a 800 Å thick recording layer 13 of TbFeCo or the like are formed in that order by sputtering or the like on the reproducing layer 11 storing the magnetic information in a high density. The intermediate layer 12 and the recording layer 13 are magnetized in the same direction as that of magnetization of the reproducing layer 11 and, consequently, the magnetic pattern of the high-density magnetic recording medium 30 is copied into the recording layer 13.

Although the method in accordance with the present invention has been described as applied to fabricating the three-layer magnetooptic recording medium comprising the reproducing layer 11, the intermediate layer 12 and the recording layer 13, the method is applicable to fabricating magnetooptic recording media including the magnetooptic recording medium comprising the reproducing layer 11, the intermediate layer 12, the recording layer 13, and the auxiliary reproducing layer 17 formed between the reproducing layer and the intermediate layer 12, for use on the foregoing magnetooptic recording/reproducing systems of various types.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of fabricating a magnetooptic recording medium having at least a reproducing layer and a recording layer, from which information recorded on the recording layer is read out by changing the state of magnetization of the reproducing layer, said method comprising steps of:

forming the reproducing layer on a substrate;

forming a high-density magnetic pattern representing information by putting a magnetic recording medium storing the information in a high density in the magnetic pattern in close contact with the reproducing layer to copy the magnetic pattern into the reproducing layer; and forming a recording layer over the reproducing layer after storing the information on the reproducing layer, to magnetize the recording layer in the magnetic pattern.

* * * * *